United States Patent
Wagner

[15] 3,665,824
[45] May 30, 1972

[54] PHOTOGRAPHIC APPARATUS WITH AUTOMATIC EXPOSURE CONTROL

[72] Inventor: Karl Wagner, Ottobrunn, Germany
[73] Assignee: Agfa-Gevaert Aktiengesellschaft, Leverkusen, Germany
[22] Filed: July 31, 1970
[21] Appl. No.: 59,999

[30] Foreign Application Priority Data
Aug. 6, 1969 Germany...................P 19 39 950.9

[52] U.S. Cl. .........................................95/10 CT, 95/53 EB
[51] Int. Cl. .......................................G03b 7/08, G03b 9/62
[58] Field of Search ..........................95/10 C, 53 EB, 10 CT

[56] References Cited

UNITED STATES PATENTS

| | | |
|---|---|---|
| 3,503,313 | 3/1970 | Kuramoto................................95/10 C |
| 3,470,798 | 10/1969 | Miyakawa................................95/10 C |

FOREIGN PATENTS OR APPLICATIONS

| | | |
|---|---|---|
| 29,623 | 12/1969 | Japan.........................................95/10 C |

Primary Examiner—Samuel S. Matthews
Assistant Examiner—Russell E. Adams, Jr.
Attorney—Michael S. Striker

[57] ABSTRACT

The difference in voltages across two photoconductors, one exposed to direct scene light and the other to scene light that has passed through the camera objective, drives a moving-coil instrument, the pointer of which controls a movable mask that more and more shields the second photoconductor until the voltages across the two photoconductors are approximately equal. A capacitor then charges through the second photoconductor to a voltage that closes the shutter.

10 Claims, 2 Drawing Figures

INVENTOR
Dr. KARL WAGNER
BY

3,665,824

PHOTOGRAPHIC APPARATUS WITH AUTOMATIC EXPOSURE CONTROL

BACKGROUND OF THE INVENTION

The invention relates to a photographic camera having an exposure control arrangement with a light-sensitive element.

SUMMARY OF THE INVENTION

An object of the invention is an arrangement in a photographic apparatus, such as a single lens reflex camera, that enables accurate consideration to be taken of the light through the objective while the exposure control arrangement is in operation.

The invention essentially consists, in a photographic apparatus, of a picture-taking objective, and exposure control means comprising an electric circuit having a first portion operative to close the shutter and including exposure time determining capacitor means, and a light-measuring second portion comprising first and second light-sensitive means for providing each a voltage dependent on the light incident thereupon, said first and second light-sensitive means being respectively exposed to direct scene light and to scene light that has passed through the objective, adjustable light-obturating means positioned to control the amount of light incident on the first light-sensitive means, adjusting means for positioning the light obturating means in dependence on the difference in voltages between the first and second light-sensitive means so as to provide a predetermined ratio between the voltages, and first switch means for connecting the capacitor means to the first light-sensitive means for charging to a predetermined value at which the capacitor means initiates the closing of the shutter.

As a rule, reflex cameras use pivoting mirrors, the mirror normally reflecting light to the light-sensitive means exposed to scene light passing through the objective. When the mirror pivots, the light-sensitive means is no longer exposed to light and its resistance is nearly infinite. In accordance with the invention, a second light-sensitive means, exposed to direct scene light, can be used for determining the exposure time.

The novel features which are considered as characteristic of the invention are set forth in particular in the appended claims. The invention itself, however, both as to its construction and its method of operation, together with additional objects and advantages thereof, will be understood best from the following description of specific embodiments when read in connection with the accompanying drawing.

DESCRIPTION OF THE PREFERRED EMBODIMENTS

Figure 1:
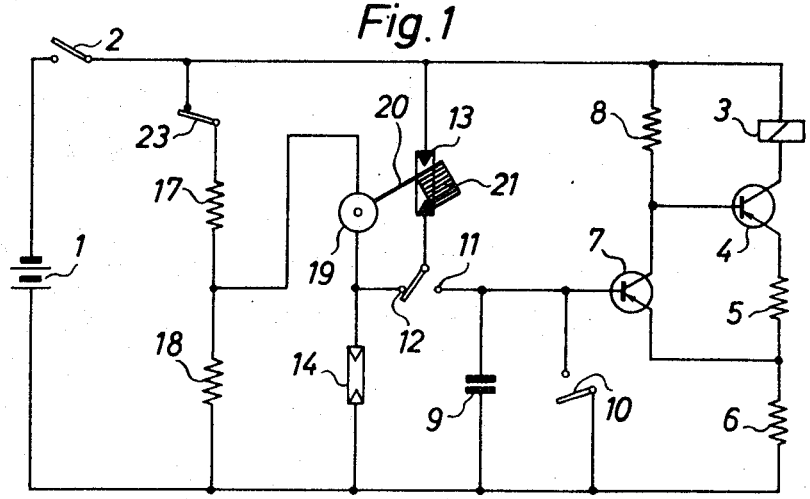
FIG. 1 is a schematic diagram of the circuit of the invention.

With reference to FIG. 1, a voltage source 1 is connectable by an operating switch 2 to a shutter-control magnet 3. The magnet 3 is connected in the collector circuit of a transistor 4, in the emitter circuit of which resistors 5 and 6 are connected. A tap between the resistors 5 and 6 is connected to the emitter of a further transistor 7, in the collector circuit of which a resistor 8 is connected. The collector of transistor 7 is connected to the base of transistor 4. The base of transistor 7 is connected to a charging capacitor 9, which, before the exposure is begun, is short-circuited by a switch 10, which is opened during the exposure in order to permit the capacitor 9 to charge. The length of the exposure is determined by the amount of time it takes to charge the capacitor 9 to a predetermined value. To permit charging of this capacitor, the capacitor can be connected in series with a photoconductor 13 by the contact 11 of a switch 11, 12. The photoconductor 13 is so arranged in the upper part of the camera that it is exposed to direct scene light.

Before the exposure is begun, the contact 12 of the switch 11, 12 connects the photoconductor 13 in series with a further photoconductor 14, which is so arranged in the housing of the camera that light passing through the objective 15 is reflected by the pivotal mirror 16 and falls upon the photoconductor 14. The two photoconductors 13 and 14 are each one arm of a bridge, of which the other two arms are composed of respective resistors 17 and 18. The resistors 17 and 18 have equal resistance.

Connected in a diagonal of the bridge is a moving-coil instrument 19, which has a movable pointer 20 that controls the position of a movable obturator. The obturator, which in the present embodiment is shown in the form of a mask 1, has an opening 22 through which the photoconductor 13 is exposed to direct scene light. A switch 23 enables the moving-coil instrument 19 to be connected and disconnected from the circuit. When an exposure is being made the switch 23 is opened.

The light obturator, instead of being in the form of a mask 21, can also be an optical gray wedge filter or a conventional diaphragm with blades.

Figure 2:
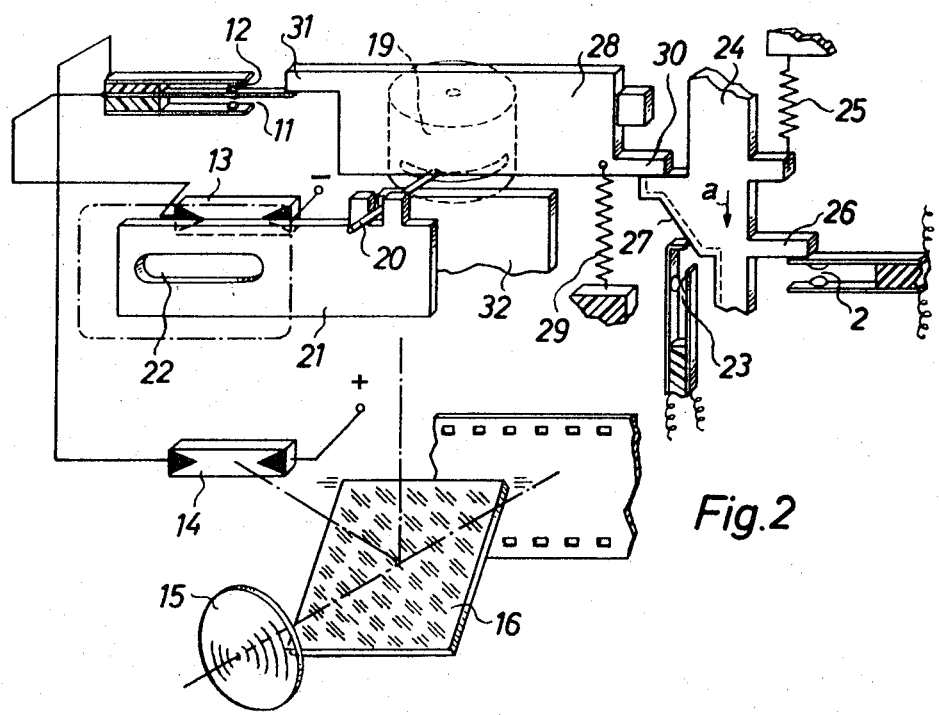
FIG. 2 schematically shows the mechanical arrangement for controlling the circuit shown in FIG. 1.

As shown in FIG. 2 there is provided a release 24 biased by a spring 25. The release 24 incorporates a projection 26 that closes the operating switch 2. A further projection 27 incorporated by the release 24 operates the switch 23. A holding bar 28, biased by a spring 29, has a projection 30 that rests on the projection 27 of the release 24.

A projection 31 on the holding bar 28 operates the switch 11, 12. A member 32 supports the pointer 20 of the moving-coil instrument 19.

The arrangement operates in the following manner. When the release 24 is first moved in the direction of the arrow a, the operating switch 2 is closed, so that the circuit shown in FIG. 1 is furnished with current from the source 1. Depending on the kind of objective 15 used, the photoconductor 14 will receive an amount of light different from the amount of light received by the photoconductor 13. Consequently, the bridge is not balanced. There appears across the bridge diagonal, and therefore on the moving-coil instrument 19, a voltage that moves the pointer 20 an amount dependent on the differing amounts of light incident on the two photoconductors 13 and 14. When the pointer 20 moves it pulls along the mask 21, which latter increasingly covers the photoconductor 13. The covering of the photoconductor 13 continues until the resistance of the latter is approximately as great as the resistance of the photoconductor 14. For this to be true, it is essential that the resistors 17 and 18 are of equal value. Once the bridge is balanced, further movement of the release 24 permits the holding bar 28 to move downward and to hold the mask 21, and therefore the pointer 20, in position. During further movement of the release 24 the projection 27 opens the switch 23 and thus disconnects the instrument 19 from the circuit.

The projection 31 of the holding bar 28 opens the contact 12 and closes the contact 11, thereby connecting the capacitor 9 in series with the photoconductor 13.

The switch 10 is opened at the beginning of the exposure, enabling the capacitor 9 to charge through the photoconductor 13. After a determined time the voltage across the capacitor 9 reaches the value at which the transistor 7 turns on, thereby turning off transistor 4, so that the shutter-control magnet 3 is de-energized. The part of the circuit containing the transistors 4 and 7 operates in a known manner.

In accordance with the invention, the obturator can be spring-biased and freed from its normal position by operation of the release to move to a second position that is determined by the position of the pointer 20, which latter acts as a stop for the obturator.

It will be understood that each of the elements described above, or two or more together, may also find a useful application in other types of constructions differing from the types described above.

While the invention has been illustrated and described as embodied in a photographic apparatus with automatic exposure control, it is not intended to be limited to the details shown, since various modifications and structural changes maybe be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a photographic apparatus having shutter means movable between open and closed positions with variable delay to determine the exposure time, a combination comprising a picture-taking objective, and exposure control means comprising an electric circuit having a first portion operative to close the shutter means and including exposure time determining capacitor means, and a light-measuring second portion comprising first and second light-sensitive means each of said light-sensitive means providing voltage depending on the light incident thereupon, said first and second light-sensitive means being respectively exposed to direct scene light and to scene light that has passed through said objective, adjustable light-obturating means positioned to control the amount of light incident on said first photosensitive means, adjusting means for positioning said light-obturating means in dependence on the difference in voltages between said first and second photosensitive means so as to provide a predetermined ratio between said voltages, and first switch means for connecting said capacitor means to said first photosensitive means for charging to a predetermined value at which said capacitor means initiates the closing of the shutter means.

2. In a photographic apparatus as defined in claim 1, further including electric bridge means having first and second arms respectively comprised by said first and second light-sensitive means, and wherein said adjusting means are connected in said bridge and include output member means moved by said adjusting means as a function of said predetermined ratio for positioning said light-obturating means.

3. In a photographic apparatus as defined in claim 2, wherein said adjusting means and output means are respective moving-coil instrument means and pointer means.

4. In a photographic apparatus as defined in claim 2, including second switch means operative to switch said adjusting means out of said bridge means before said capacitor means begins to charge.

5. In a photographic apparatus as defined in claim 2, wherein said bridge means include third and fourth resistance arms.

6. In a photographic apparatus as defined in claim 5, wherein said third and fourth arms are of equal resistance value and said predetermined ratio is 1:1.

7. In a photographic apparatus as defined in claim 2, including movable holding means operable to move from a first to a second position to hold said output member in position after the latter has been moved by said adjusting means.

8. In a photographic apparatus as defined in claim 7, wherein said holding means include operating means for cooperating with said first switch means to operate the latter when said holding means move from said first to said second position.

9. In a photographic apparatus as defined in claim 2, including resilient means for biasing said light-obturating means from a first fixed to a second variable position, release means for operating said obturating means to permit movement thereof from said first to said second position, and wherein said output member means is a stop for said obturating means at said second variable position thereof.

10. In a photographic apparatus as defined in claim 1, wherein said first switch means series-connects said capacitor means to said first light-sensitive means.

* * * * *